United States Patent
Hice (10) Patent No.: US 6,370,231 B1
(45) Date of Patent: Apr. 9, 2002

(54) METHOD AND SYSTEM FOR CALCULATING THE ESTIMATED TIME OF ARRIVAL OF A SERVICE TECHNICIAN

(75) Inventor: Janice Paris Hice, Jacksonville, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/448,652

(22) Filed: Nov. 24, 1999

Related U.S. Application Data (60) Provisional application No. 60/109,706, filed on Nov. 24, 1998.

(51) Int. Cl.[7] .......................... H04M 1/24; H04M 3/08; H04M 3/22
(52) U.S. Cl. .................. 379/32.01; 379/9.02; 379/9.03; 705/8; 705/9
(58) Field of Search .......................... 705/8–9; 379/1.01, 379/9.02–9.04, 15.03, 32.01–32.05

(56) References Cited

U.S. PATENT DOCUMENTS

| | | | |
|---|---|---|---|
| 5,006,983 A | | 4/1991 | Wayne et al. |
| 5,325,156 A | * | 6/1994 | Ulinski |
| 5,467,268 A | | 11/1995 | Sisley et al. |
| 5,511,112 A | | 4/1996 | Szlam |
| 5,615,121 A | | 3/1997 | Babayev et al. |
| 5,623,404 A | | 4/1997 | Collins et al. |
| 5,638,427 A | * | 6/1997 | Flemming et al. |
| 5,640,505 A | | 6/1997 | Hearn et al. |
| 5,692,030 A | * | 11/1997 | Teglovic et al. |
| 5,737,728 A | | 4/1998 | Sisley et al. |
| 5,798,950 A | | 8/1998 | Fitzgerald |

* cited by examiner

Primary Examiner—Duc Nguyen
(74) Attorney, Agent, or Firm—Kilpatrick Stockton (57) ABSTRACT

A system and method are disclosed for reporting an estimated time at which a task will be processed. A user interface receives a status query and transfers this information to a controller. The controller is configured to receive the status query and based upon the status query, selects a proper task administration system from a plurality of task administration systems. The controller then collects status data from the proper task administration system and from this status data calculates the estimated time at which a task will be processed. After the calculation has been made, the controller then reports the estimated time at which the task will be processed back to the user interface.

18 Claims, 6 Drawing Sheets

METHOD AND SYSTEM FOR CALCULATING THE ESTIMATED TIME OF ARRIVAL OF A SERVICE TECHNICIAN

RELATED APPLICATION

This U.S. patent application claims priority to U.S. Provisional Patent Application Serial No. 60/109,706 entitled "METHOD AND SYSTEM FOR CALCULATING THE ESTIMATED TIME OF ARRIVAL OF A SERVICE TECHNICIAN" filed Nov. 24, 1998 which is incorporated herein by reference. The present application and the related U.S. provisional patent application are commonly assigned to BellSouth Intellectual Property Corporation.

FIELD OF THE INVENTION

The present invention generally relates to estimated time of arrival reporting systems, and more particularly relates to a method and system or utilizing data stored on a multitude of different computer systems of a service provider to calculate and report estimated time of arrival for given tasks.

BACKGROUND OF THE INVENTION

Figure 1:
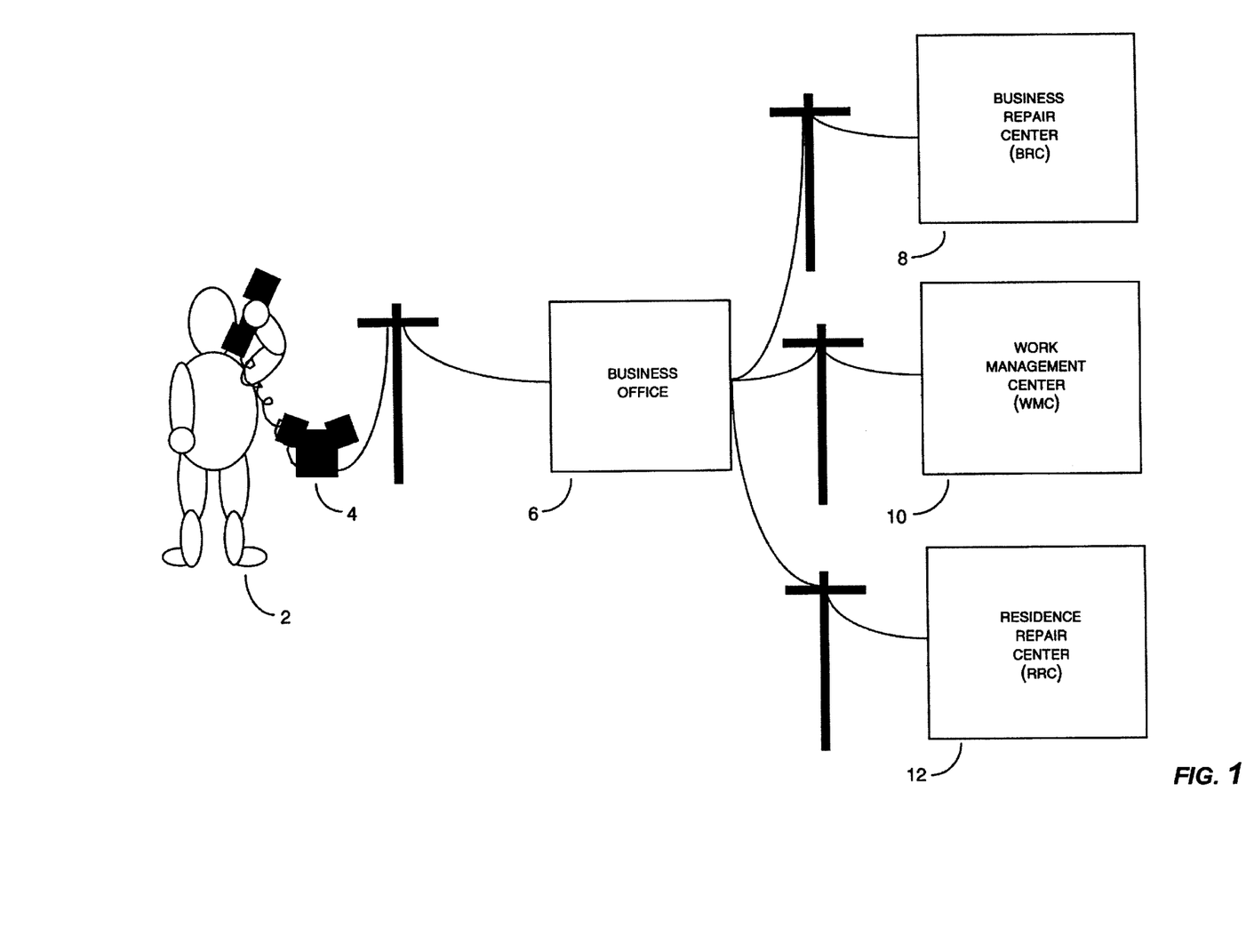
FIG. 1 is a block diagram illustrating the problem addressed by the present invention.

The present invention seeks to reduce the amount of time necessary to locate current detailed status information regarding the estimated time of arrival (ETA) of a customer service technician. In the past, when a customer called to inquire about the ETA of a previously scheduled service appointment, the customer was often faced with long delays spent on "hold," or waiting for a customer service representative to call them back. These delays were typically the result of the customer service representative having to manually locate information regarding the ETA by telephoning the appropriate maintenance center or other locations. As shown in FIG. 1, in the past, a customer service representative 2 may have had to call the business office 6 to obtain status information for the customer. If the required status information was not available at the business office 6, additional calls may have had to been placed to the business repair center 8, the work management center 10, or the residential repair center 12. This sequence of calls frequently left customers waiting for long periods of time for status information.

The present invention solves this problem by providing an interface to legacy status systems for use by customer service representatives that substantially reduces the amount of time customers must wait for status information

SUMMARY OF INVENTION

One aspect of the present invention is a system for reporting an estimated time at which a task will be processed. The system can include a first task administration system containing status data for a plurality of tasks and a second task administration system containing status data for a second plurality of tasks. A user interface is employed to receive a status query related to a specified task having a characteristic unique to one of the task administration systems. In addition, the system includes a controller configured to retrieve status data related to the specified task from one of the task administration systems identified by the status query characteristics. Next, the system calculates the estimated time of arrival relating to the specified task from one of the task administration systems identified by the status query characteristics and sends the estimated time of arrival to the user interface.

Another aspect of the present invention is a method for reporting an estimated time at which a task will be processed. The method receives a request; analyzes the request for unique parameters; accesses a proper task administration system from a plurality of task administration systems based upon the analysis; receives status data from the proper task administration system; calculates an estimated time of arrival utilizing the status data; and transmits the estimated time of arrival to a recipient.

Other objects, features, and advantages of the present invention will become apparent upon reading the following description of exemplary embodiments, when taken in conjunction with the drawings and the claims.

DETAILED DESCRIPTION OF THE INVENTION

Figure 2:
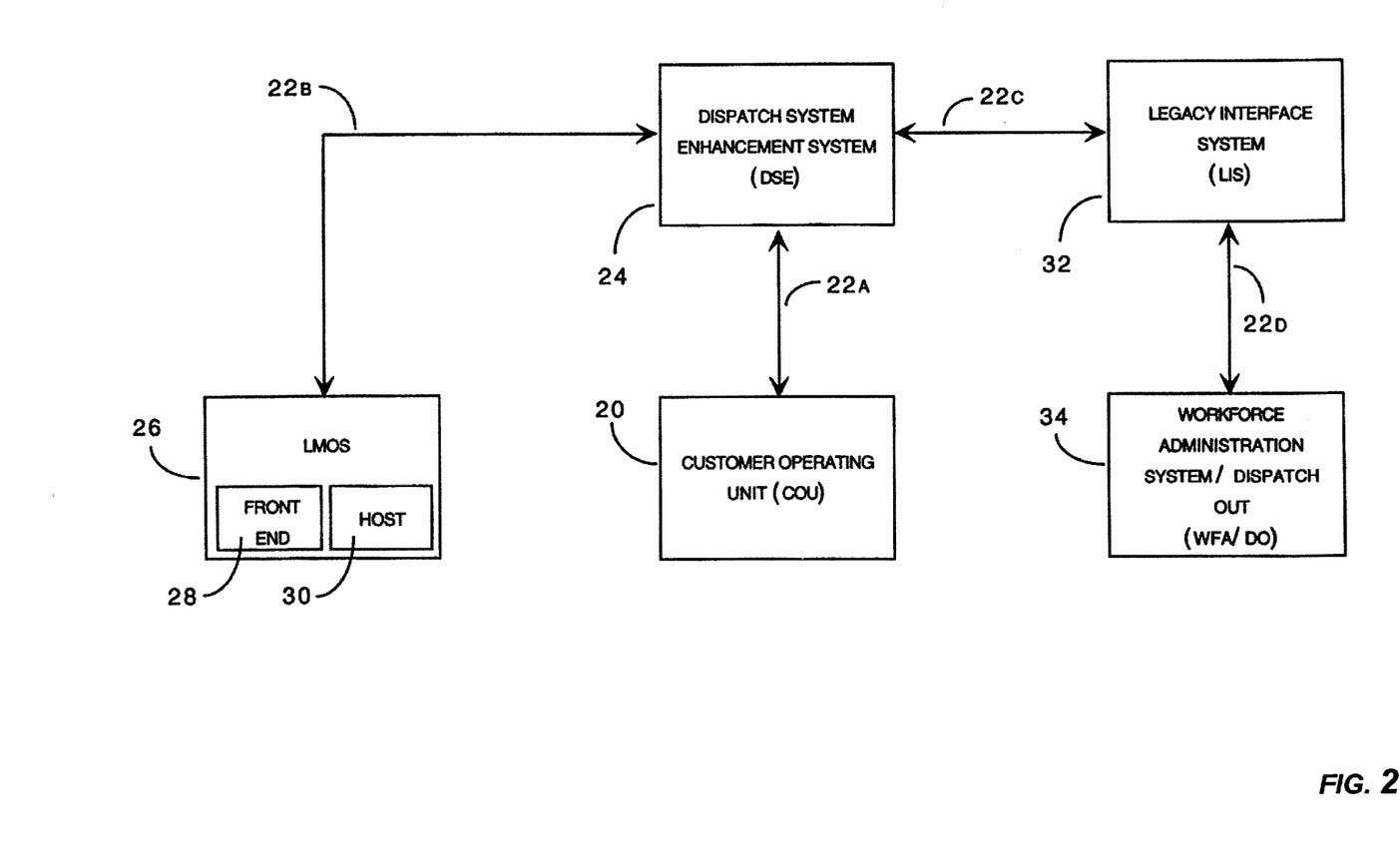
FIG. 2 is a block diagram illustrating the illustrative operating environment of the present invention.

FIG. 2 and the following discussion are intended to illustrate an exemplary embodiment of a distributed computing environment in which the invention may be implemented. Referring now to FIG. 2, an illustrative system for implementing the invention includes a customer operating unit (COU) 20 that is a conventional computer terminal used for generating a request for status information on a service order. Typically, COU 20 is a personal computer, X-windows terminal, or other similar workstation. The COU 20 is generally operated by a customer service representative or other service personnel who requires access to service technician status information. The customer service representative communicates status information displayed by the COU 20 to the requesting customer.

Multiple COU's 20 are typically connected to the Dispatch System Enhancement (DSE) system 24 via communications link 22a. The COU 20 transmits status requests and receives status information via a client-server communication protocol. In the illustrative embodiment of the present invention, the COU 20 transmits and receives data from the DSE system 24 in hyper-text markup language and displays this data using a standard world-wide-web browser. In this manner, a wide range of computers and workstations may be advantageously utilized as COU's 20.

The DSE system 24 comprises two servers, each with a keyboard and monitor, primary mass storage, data backup mass storage, and communications devices. In the illustrative embodiment, the DSE system 24 is comprised of a primary server and a secondary server that is used as a failover device in the case of the loss of the primary. The DSE system 24 also utilizes two disk towers for primary mass storage. The primary server utilizes the first disk tower for "reads" and "writes," and the second server utilizes the second disk tower for mirroring data. The second disk tower may also be used by the first server for "reads." Switching to redundant components in the event of failure is controlled automatically via software.

In the illustrative operating environment, the DSE system 24 comprises two identical Hewlett Packard (HP) 9000 Model T500 computer systems, configured with 8 central processing units, 1.5 gigabytes of dynamic random access memory, and networking capabilities. Fifteen 2 gigabyte disk drives are used for on-line databases, archive databases and application software. Frequency of backups for specific files will vary depending on volatility of data. The DSE system 24 runs the HP-UX operating system. Those skilled in the art will recognize that a wide range of computer hardware and operating systems are suitable for implementing the present invention.

The DSE system 24 is connected to the Loop Maintenance operating System (LMOS) 26 via communications link 22b, which is a Secure Local Area Network with other systems attached. The LMOS system 26 is a legacy system for providing status information on service orders for plain old telephone systems (POTS). The LMOS system 26 is comprised of two separate systems in which status information may be located, the LMOS front end (LMOS/FE) 28 and the LMOS HOST 30. The LMOS system 26 receives requests for status information from DSE system 24 via communications link 22b, searches for the status information in the LMOS/FE 28 and/or the LMOS HOST 30, calculates the estimated time of arrival (ETA) for the service technician, and transmits status information back to the DSE system 24. Operation of the LMOS system 26 is discussed in more detail below with reference to FIG. 4.

The DSE system 24 is further connected to Legacy Interface System (LIS) 32 via communications link 22c. The LIS system 32 is further connected to the Workforce Administration System/Dispatch Out (WFA/DO) system 34 via communications link 22d. Generally described, the LIS system 32 acts as a protocol converter between the DSE system 24 and the WFA/DO system 34.

The WFA/DO system 34 is a legacy system for providing status information on orders for complex business telephone lines and special service circuits. The WFA/DO system 34 may provide status information regarding the orders assigned to a particular technician, the sequence of the orders, the estimated time of completion for each order, and the amount of travel time to the location of the next order. This information may then be transmitted to the LIS system 32 via communications link 22d. The LIS system 32 may then utilize this information to calculate the ETA for the service technician, or the LIS system 32 may relay this information to the DSE system 24 so that the DSE system 24 may calculate the ETA. The operation of the WFA/DO system 34 and the LIS system 32 is discussed in further detail below with reference to FIG. 5.

Once the DSE system 24 has received status information from either the LMOS system 26 or the WFA/DO system 24, the DSE system 24 communicates the information to COU 20 via communications link 22a. The customer service representative operating the COU 20 may then provide the information to the requesting customer or take additional action as necessary.

Figure 3:
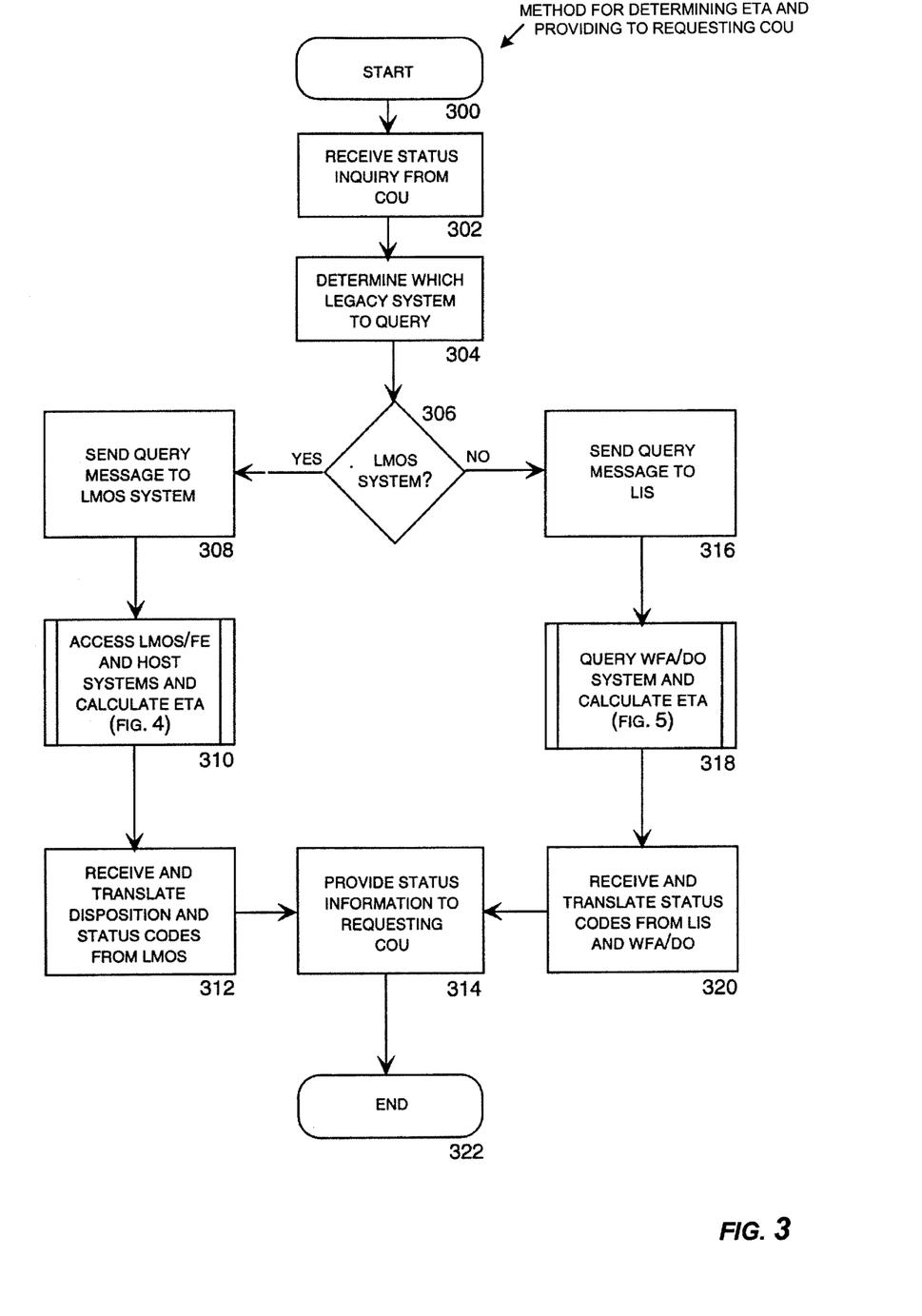
FIG. 3 is a flow chart diagram showing an illustrative method for determining the ETA, and for providing the ETA to the requesting customer operating unit.
Figure 4:
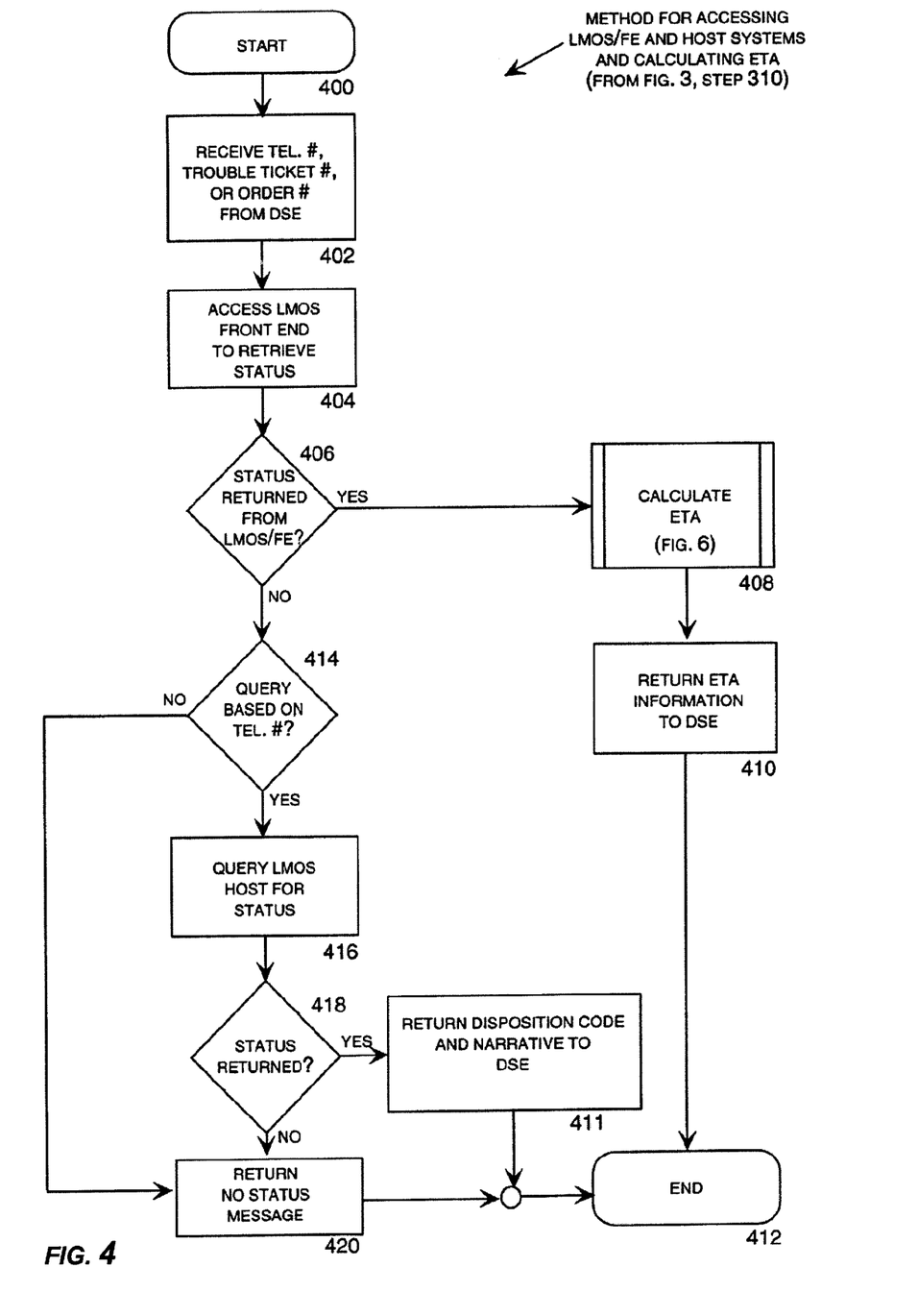
FIG. 4 is a flow chart diagram showing an illustrative method for accessing LMOS/FE and LMOS HOST legacy systems to obtain status information.
Figure 5:
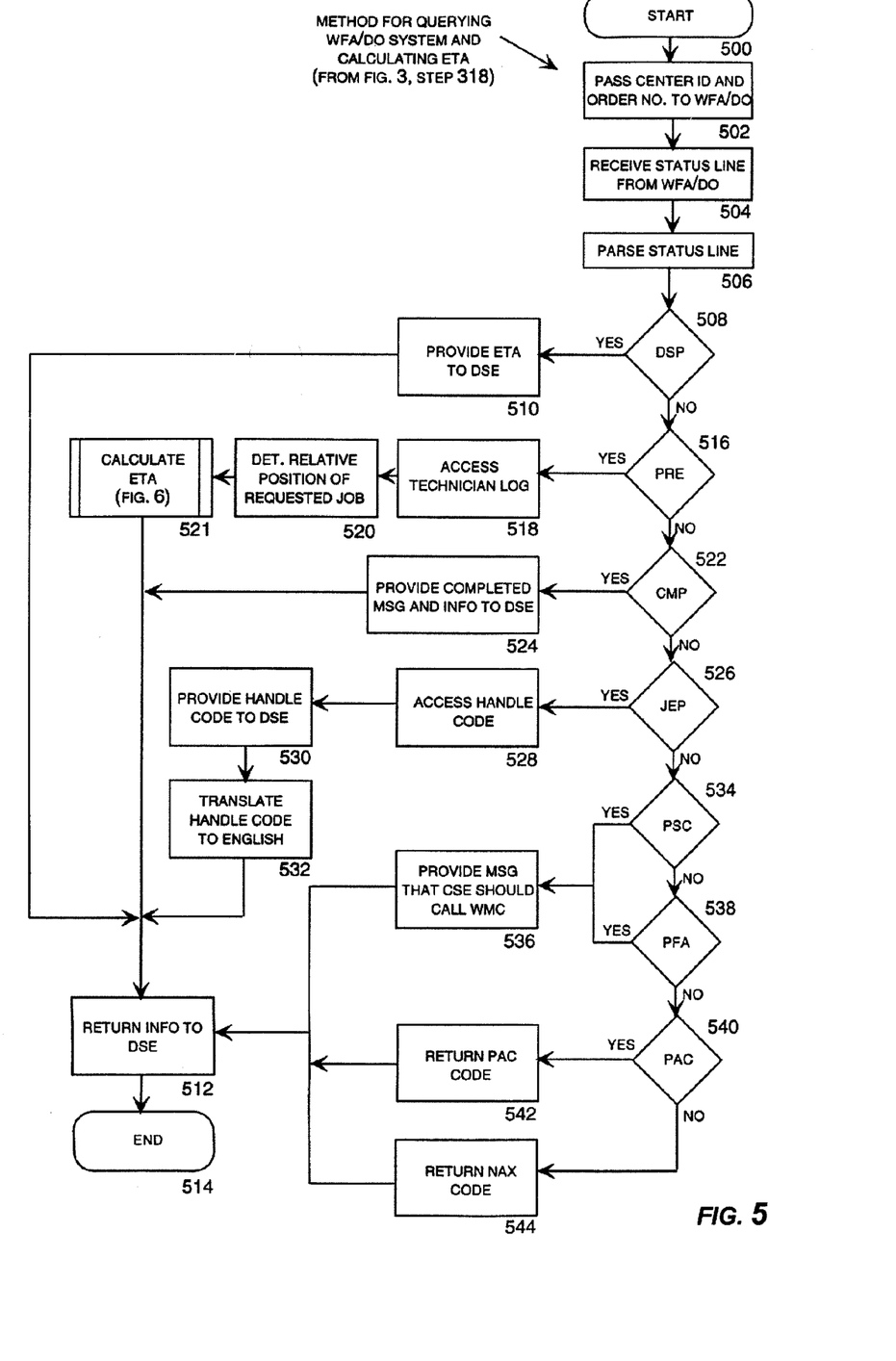
FIG. 5 is a flow chart diagram showing an illustrative method for accessing a WFA/DO legacy system to obtain status information.
Figure 6:
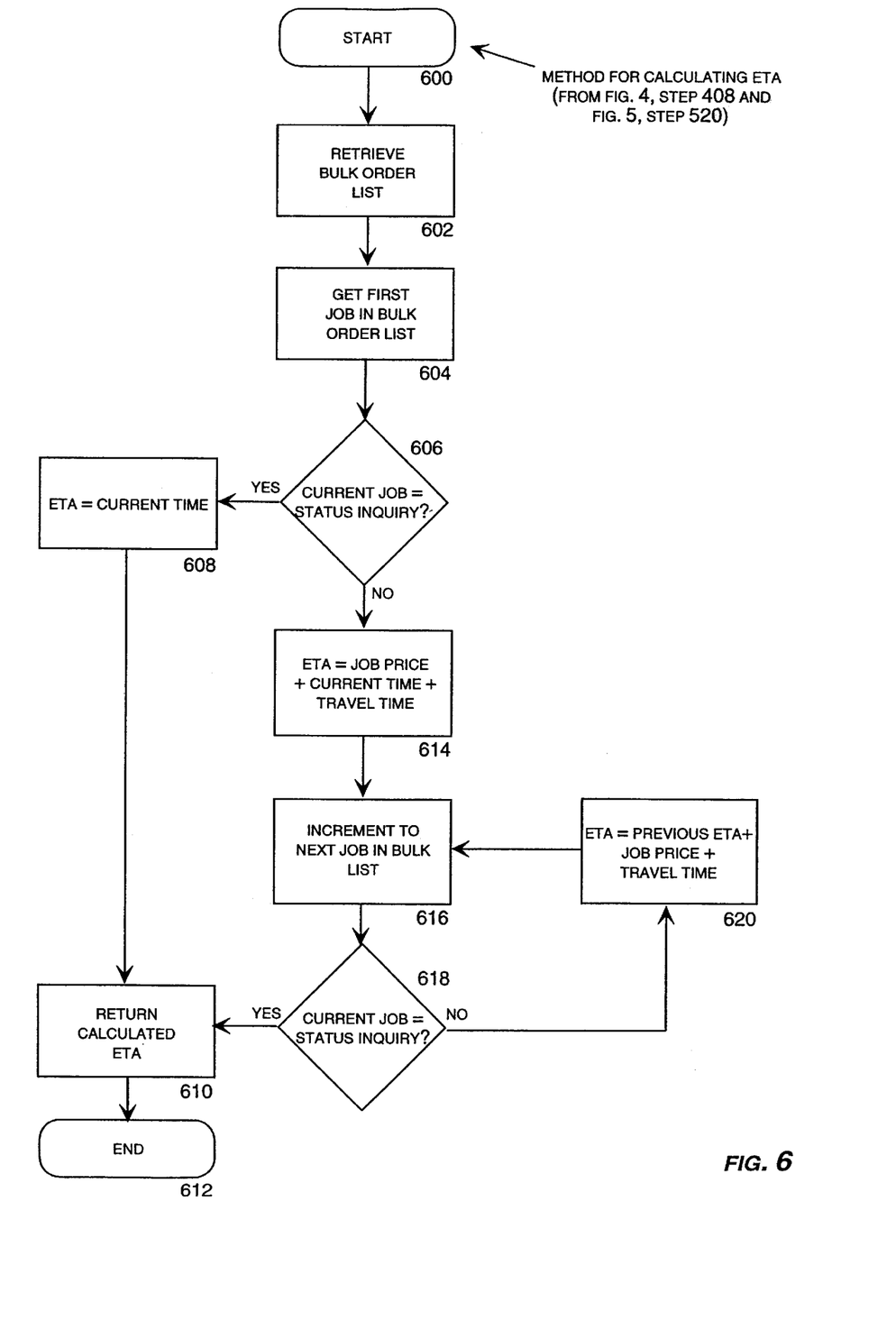
FIG. 6 is a flow chart diagram showing an illustrative method for calculating the ETA for a service technician using information provided by the legacy systems.

With the above preface on the illustrative operating environment for embodiments of the present invention, the remaining FIGS. 3–6 illustrate several aspects of several embodiments of the present invention. FIG. 3 illustrates the general method for determining the ETA for a service technician and providing the requested information to the appropriate customer operating unit (COU). FIG. 4 illustrates a method for accessing the LMOS/FE and HOST systems for status information and calculating the ETA. FIG. 5 illustrates a method for querying the WFA/DO system for status information and calculating the ETA. FIG. 6 illustrates a method for calculating the ETA utilizing a bulk load list.

Referring now to FIGS. 2 and 3, an illustrative method 300 for determining the ETA of a service technician and providing the ETA to the requesting COU is described. The method 300 begins at step 302, where a status inquiry is received from a requesting COU 20. The status inquiry is typically initiated by a customer service representative operating the COU 20 and in response to a customer request for status information. The status request message may include a ten digit telephone number, circuit ID, item number, trouble ticket number, or order number that identifies the job for which status is sought. The status request message may also include a designed/non-designed indication.

From step 302, the method continues to step 304, where a determination is made as to which legacy system, either the LMOS system 26 or the WFA/DO system 34, or both, should be queried for the requested status information. If the status request message identifies a non-designed order number or a trouble ticket number, the LMOS/FE system 28 is queried, and if no status is found, then the WFA/DO system 34 is queried. If the status request message identifies a designed order or trouble ticket, only the WFA/DO system 34 is queried. The appropriate legacy system may also be determined based upon the NPA-NXX of the telephone number identified in the status request message. A group of 10,000 directory numbers having the same first six digits is referred to as an "NPA-NXX."

From step 304, the method continues to step 306, where a determination is made as to whether the LMOS system 26 was identified in step 304 as the legacy system to be queried. If the LMOS system 26 was identified as the proper legacy system to be queried, the method continues to step 308, where a query message is sent to the LMOS system 26 requesting status information for the job. Once the LMOS system 26 has received the status request from the DSE system 24, the LMOS/FE 28 and the LMOS HOST system 30 are queried for status information at step 310. If status information was returned, the ETA is then calculated. From the status information, the ETA is calculated by adding the estimated time of completion of the task the technician is currently servicing, plus the estimated time to complete and the travel time for each task that is scheduled prior to the job for which the request was made. The operation of the LMOS system 26 and the calculation of the ETA are discussed in more detail with reference to FIGS. 4 and 6, below.

From step 310, the method continues to step 312, where the disposition code is transmitted from the LMOS system 26 to the DSE system 24 in response to the query request. The disposition code may include information regarding the ETA of the service technician, or may indicate that no status was located. The DSE system 24 then converts the disposition code into an English language translation. The DSE accomplishes this conversion by parsing a status response message received from the LMOS system with status returned, and extracts English text information defined in a data store or other rule repository.

From step 312, the method continues to step 314, where the DSE system 24 transmits the status information to the requesting COU 20 over transmission link 22a. The status information may then be provided to the requesting customer by the customer service representative, or additional action may be taken as necessary. The method 300 then ends at step 322.

Referring again to step 306, if a determination is made that the LMOS system 26 is not to be queried, the method 300 branches to step 316. At step 316, a status query message is sent to the Legacy Interface System (LIS) 32, and subsequently, to the WFA/DO system 34. At step 318, the WFA/DO system 34 is queried for status information, and the ETA is calculated based upon the information received from the WFA/DO system 34. Operation of the WFA/DO system 34 and the calculation of the ETA based upon information received from the WFA/DO system 34 is discussed in detail below with reference to FIGS. 5 and 6.

From step 318, the method 300 continues to step 320, where status codes are received from the WFA/DO system 34 and the LIS system 32. This information may be parsed and translated into English or any other language as described above with reference to the LMOS system 26. At step 314, the status information is transmitted to the appropriate COU 20. The method 300 ends at step 322.

Referring now to FIGS. 2 and 4, the method 400 for accessing the LMOS/FE 28 and LMOS HOST 30 systems will be described. The method 400 begins at step 402, where an NPA-NXX, trouble ticket number, or order number is received by the LMOS system 26 from the DSE system 24. The NPA-NXX, trouble ticket number, or order number is used to identify the telephone line number for which status is being requested. At step 404, the LMOS/FE system 28 is queried for status information. At step 406, a determination is made as to whether the LMOS/FE system 28 returned status information in response to the query. If status information was returned by the LMOS/FE system 28 in response to the query, the method 400 branches to step 408, where the ETA is calculated based upon the information returned by the LMOS/FE system 26. Calculation of the ETA is discussed below with reference to FIG. 6. From step 408, the method 400 continues to step 410, where the ETA is transmitted from the LMOS system 26 to the DSE system 24. The method 400 ends at step 412.

Referring again to step 406, if the LMOS/FE system 28 does not return status information, the method 400 branches to step 414. At step 414, a determination is made as to whether the query was initiated based upon the NPA-NXX of the telephone number for which status was requested. The LMOS HOST system 30 contains completed service information. Because the LMOS HOST system 30 cannot be queried using a trouble ticket number, the method branches to step 420 if a trouble ticket number was used in the query. If the query was not based upon a trouble ticket number, the method continues to step 416, where the LMOS HOST is queried for status information. From step 416, the method 400 continues to step 418, where a determination is made as to whether status information was returned by the LMOS HOST system 30 in response to the query. If status information was returned, the method 400 branches to step 411, where a disposition code and narrative are returned indicating that the task has been completed. If status information was not returned, the method 400 continues to step 420, where a "no status" message is returned by the LMOS system 26 to the DSE system 24. The method 400 then ends at step 412.

Referring now to FIGS. 2 and 5, the method 500 for querying the WFA/DO system 34 will be described. The method 500 begins at step 502, where the appropriate center identification number and order number are passed to the WFA/DO system 34 along with a status query message. At step 504, a status line is received from the WFA/DO system 34 which includes a status code describing the status of the requested order. From step 504, the method 500 continues to 506, where the status line is parsed to locate the status code. When parsing the status line, first the phrase "JOB STAT" is located in the status line. Next, the program looks 17 characters to the right of the "J" in "JOB STAT" and selects the 3 characters beginning in this location as the status code.

From step 506, the method 500 continues to step 508, where a determination is made as to whether the status code indicates that the requested order is in "dispatch" status (DSP). If the order is in "dispatch status," the method 500 branches to step 510, where the ETA contained in the status line is returned to the DSE system 24. If the status code does not indicate that the requested order is in "dispatch status," the method continues to step 516.

At step 516, a determination is made as to whether the status code indicates that the requested order is in "preassigned" status (PRE). If the order is in "preassigned" status, the method 500 branches to step 518, where the technician log contained in the WFA/DO system 34 is accessed to retrieve a bulk list of orders to which the appropriate technician is assigned. The method 500 then continues to step 520, where the relative position of the requested order in the bulk list is determined. From step 520, the method continues to step 521, where the ETA is calculated using the bulk list. Calculation of the ETA is discussed in detail below with reference to FIG. 6.

Referring again to step 516, if the requested order is not in "preassigned" status, the method 500 continues to step 522. At step 522, a determination is made as to whether the requested order is in "completed" status (CMP). If the requested order is in "completed" status, the method branches to step 524, where a message is provided to the DSE system 24 indicated that the service order has been completed. If the requested order is not in "completed" status, the method 500 continues to step 526.

At step 526, a determination is made as to whether the requested order is in "jeopardy" status (JEP). If the requested order is in "jeopardy" status, the method 500 branches to step 528, where the appropriate handle code is accessed. From step 528, the method continues to step 530, where the handle code is provided to the DSE system 24. The DSE system 24 then converts the handle code into English at step 532. The English translation may then be provided by the DSE system 24 to the COU 20.

Referring again to step 526, if the requested order is not in "jeopardy" status, the method 500 continues to steps 534 and 538. At steps 534 and 538, determinations are made as to whether the requested order is in "pending screen" status., or in "pending facility assignment" status (PFA). If the requested job is in either of these statuses, the method 500 branches step 536, where a message is returned to the DSE system 24 indicating that the customer service representative should call the appropriate work management center for further information. If the requested job is not in either of these statuses, the method 500 continues to step 540.

At step 540, a determination is made as to whether the requested order is in "pending auto completion" status (PAC). If the requested order is in "pending auto completion" status, the PAC code is returned to the DSE system in step 542. If the requested order is not in "pending auto completion" status, but rather in the "no access" status (NAS), the NAS code is returned to the DSE system 24 at step 544. The method 500 then continues to step 512, where the appropriate information, such as the ETA or appropriate status code, is returned to the DSE system 24. The method 500 then ends at step 514.

Referring now to FIG. 6, an illustrative method 600 for computing the ETA will be described. The method 600 begins at step 602, where the bulk load list is retrieved as described above. The bulk load list contains information regarding each of the jobs to which a particular service technician is assigned, including the order for which status was requested. At step 604, the first job in the bulk list is retrieved as the current job.

From step 604, the method 600 continues to step 606, where a determination is made as to whether the current job in the load list is the order for which status was requested. If the current job in the load list is the order for which status was requested, then the ETA is set as the current time in step 608. If the current job in the load list is not the order for which status was requested, the method 600 continues to step 614.

At step 614, the ETA is calculated as the job price, or time necessary to complete the job, added to the current time, and also added to the travel time to the next job. This calculation provides the ETA for the next job in the load list. From step 614, the current job is incremented to the next job in the load list. At step 618, a determination is made as to whether the current job in the load list is the order for which status was requested. If the current job is not the order for which status was requested, the method branches to step 620, where the job price and travel time for the current job in the load list are added to the previous ETA to give the ETA for the next job in the load list. If the current job is the order for which status was requested, the method continues to step 610, where the calculated ETA is returned to the DSE system 24. The method 600 ends at step 612.

In view of the foregoing, it will be appreciated that the present invention provides a system and method for calculating the estimated time of arrival of a service technician. It should be understood that the foregoing relates only to specific embodiments of the present invention, and that numerous changes may be made therein without departing from the spirit and scope of the invention.

LIST OF ACRONYMS USED IN THIS SPECIFICATION

| Acronym | Definition |
| --- | --- |
| CMP | Completed Status |
| COU | Customer Operating Unit |
| DSE | Dispatch System Enhancement |
| DSP | Dispatch Status |
| ETA | Estimated Time of Arrival |
| JEP | Jeopardy Status |
| LIS | Legacy Interface System |
| LMOS | Loop Maintenance Operating System |
| LMOS/FE | LMOS Front End |
| NAS | No Access Status |
| PAC | Pending Auto Completion Status |
| PFA | Pending Facility Assignment Status |
| POTS | Plain Old Telephone System |
| PRE | Preassigned Status |
| WFA/DO | Work Force Administration/Dispatch Out |

What is claimed is:

1. A system for reporting an estimated time at which a task related to telecommunication service orders will be processed, comprising:

a first task administration system containing status data for a first plurality of tasks;

a second task administration system containing status data for a second plurality of tasks;

a user interface for receiving a status query related to a specified one of the tasks, said status query having one or more characteristics unique to one of the said task administration systems;

a controller configured to:

retrieve status data related to said specified task from one of said task administration systems identified by the query characteristics;

calculate the estimated time of arrival; and         send the estimated time of arrival relating to said specified task from one of said task administration systems identified by the query characteristics to the user interface.

2. The system of claim 1, wherein the first task administration system comprises a maintenance administration system for a first telecommunications system.

3. The system of claim 1, wherein the second task administration system comprises a maintenance administration system for a second telecommunications system.

4. The system of claim 2, wherein the maintenance administration system for a first telecommunications system comprises a system for providing status information on service orders for plain old telephone systems.

5. The system of claim 4, wherein the maintenance administration system for a second telecommunications system comprises a system for providing status information on service orders for business telephone lines.

6. The system of claim 4, wherein the maintenance administration system for a second telecommunications system comprises a system for providing status information on service orders for complex business telephone lines and special service circuits.

7. The system of claim 1, wherein the controller is further configured to translate coded status data.

8. The system of claim 1, wherein one or more of the query characteristic are selected from the group: designed order numbers, non-designed order numbers, trouble ticket numbers, and the NPA-NXX of the telephone number.

9. A method for reporting an estimated time at which a task related to telecommunication service orders will be processed, comprising the steps of:

receiving a request for an estimated time of processing;

analyzing the request for unique parameters;

accessing a proper task administration system from a plurality of task administration systems based upon said analysis;

receiving status data from said proper task administration system;

calculating an estimated time of processing utilizing said status data; and     transmitting said estimated time of processing to a recipient.

10. The method of claim 9, wherein one of the plurality of task administration systems is a maintenance administration system for a first telecommunications system.

11. The method of claim 10, wherein one of the plurality of task administration systems is a maintenance administration system for a second telecommunications system.

12. The method of claim 10, wherein the maintenance administration system for the first telecommunications system is a system for providing status information on service orders for plain old telephone systems.

13. The method of claim 12, wherein the maintenance administration system for the second telecommunications system is a system for providing status information on service orders for business telephone lines.

14. The method of claim 12, wherein the maintenance administration system for the second telecommunications system is a system for providing status information on service orders for complex business telephone lines and special service circuits.

15. The method of claim 9, further comprising the step of:
if the status data is encoded, decoding said status data.

16. The method of claim 9, further comprising the step of:
if the status data is encoded, converting the code to English.

17. The method of claim 9, wherein the unique parameters analyzed are designed order numbers, non-designed order numbers, trouble ticket numbers, or the NPA-NXX of the telephone number.

18. The method of claim 9, wherein:

the request for an estimated time at which a task will be processed is a request for an estimated time of arrival for a service technician;

the status data comprises a bulk load list containing time necessary to complete the task and travel time to the next task for a plurality of tasks assigned; and calculating the estimated time of arrival further comprises the steps of:
(a) starting with the current time;
(b) adding the time necessary to complete the current task;
(c) adding the travel time between the current task and the next task in the bulk load list;
(d) repeating steps (b) and (c) for each task until the next task in the bulk load list is the task for which the request was received; and when the next task in the bulk load list is the task for which the request was received, returning the calculated estimated time of arrival.

* * * * *